US008316367B2

(12) United States Patent
Chang et al.

(10) Patent No.: US 8,316,367 B2
(45) Date of Patent: Nov. 20, 2012

(54) SYSTEM AND METHOD FOR OPTIMIZING BATCH RESOURCE ALLOCATION

(75) Inventors: Fangzhe Chang, Edison, NJ (US);
Jennifer Ren, Basking Ridge, NJ (US);
Ramesh Viswanathan, Manalapan, NJ (US)

(73) Assignee: Alcatel Lucent, Paris (FR)

( * ) Notice: Subject to any disclaimer, the term of this patent is extended or adjusted under 35 U.S.C. 154(b) by 982 days.

(21) Appl. No.: 12/353,502

(22) Filed: Jan. 14, 2009

(65) Prior Publication Data

US 2010/0180280 A1   Jul. 15, 2010

(51) Int. Cl.
*G06F 9/46* (2006.01)
(52) U.S. Cl. ........................................................ 718/101
(58) Field of Classification Search .................. None
See application file for complete search history.

(56) References Cited

U.S. PATENT DOCUMENTS

| 5,619,695 | A  | * | 4/1997  | Arbabi et al.    | 718/104 |
| 6,353,844 | B1 | * | 3/2002  | Bitar et al.     | 718/102 |
| 7,406,689 | B2 | * | 7/2008  | Berstis et al.   | 718/102 |
| 2005/0198636 | A1 | * | 9/2005  | Barsness et al. | 718/100 |
| 2007/0245351 | A1 | * | 10/2007 | Sussman et al.   | 718/104 |

* cited by examiner

Primary Examiner — Jacob A Petranek
(74) Attorney, Agent, or Firm — Hitt Gaines, PC

(57) ABSTRACT

A system for configuring resources in an environment for use by at least one process. In one embodiment, the system includes: (1) a process sorter configured to rank the at least one process based on numbers of resources that steps in the at least one process can use, (2) an optimizer coupled to the process sorter and configured to employ an optimization heuristic to accumulate feasible allocations of resources to the steps based on the ranking of the at least one process, (3) a resource sorter coupled to the optimizer and configured to rank the resources in a non-decreasing order based on numbers of the steps in which the resources can be used, the optimizer further configured to remove one of the resources from consideration based on the ranking of the resources until infeasibility occurs and (4) an environment configuration interface configured to allow the environment to be configured in accordance with remaining ones of the resources.

20 Claims, 3 Drawing Sheets

SYSTEM AND METHOD FOR OPTIMIZING BATCH RESOURCE ALLOCATION

TECHNICAL FIELD

This application is directed, in general, to allocating resources in an environment and, more specifically, to a system and method for performing batch resource allocation and configuring an environment such that its resources are optimally allocated.

BACKGROUND

Resource allocation is an important issue in many applications, including networking, distributed computing and software testing. Resource allocation in general involves an environment having resources that are pooled and allocated to a process to satisfy its needs. "Batch resource allocation" occurs when multiple processes contend for a pool of resources and is often encountered in the context of distributed computing or automated testing.

A material constraint of the batch resource allocation problem is that, while resources can be reused across different processes, they are subject to mutually exclusive use among the concurrent steps of any individual process. As a result, optimizing the general batch resource allocation problem is NP-hard, which implies that an efficient (polynomial time) method for finding the exact optimum solution is unlikely to exist. The proper management of batch resource allocation typically reduces the resource management (e.g., setup) costs for the environment and allows more processes to share the pool of resources simultaneously. Unfortunately, while batch resource allocation can provide substantial benefits, efforts to date have instead focused on allocation of resources with respect to a single (parallel or distributed) process, in which resources aren't reused.

For instance, in distributed or "grid" computing, users reserve resources with certain characteristics (e.g., machines with more than 1 GB memory) for high-demand parallel computations. Protocols, such as the well-known Condor-G Matchmaking protocol, are used to specify various constraints on resource properties for a single process. In the networking community, test beds such as PlanetLab (a large-scale distributed environment) have been developed to encourage designing and experimenting new networking protocols (e.g., application-level multicast). Systems such as Plush provide a user shell that helps users manage applications and resources on PlanetLab. All these systems support resource allocation and reservation only for single processes.

SUMMARY

One aspect provides a system for configuring resources in an environment for use by at least one process. In one embodiment, the system includes: (1) a process sorter configured to rank the at least one process based on numbers of resources that steps in the at least one process can use, (2) an optimizer coupled to the process sorter and configured to employ an optimization heuristic to accumulate feasible allocations of resources to the steps based on the ranking of the at least one process, (3) a resource sorter coupled to the optimizer and configured to rank the resources in a non-decreasing order based on numbers of the steps in which the resources can be used, the optimizer further configured to remove one of the resources from consideration based on the ranking of the resources until infeasibility occurs and (4) an environment configuration interface configured to allow the environment to be configured in accordance with remaining ones of the resources.

Another aspect provides a method of configuring resources in an environment for use by at least one process. In one embodiment, the method includes: (a) ranking the at least one process based on numbers of resources that steps in the at least one process can use, (b) employing an optimization heuristic to accumulate feasible allocations of resources to the steps based on the ranking of the at least one process, (c) ranking the resources in a non-decreasing order based on numbers of the steps in which the resources can be used, (d) removing one of the resources from consideration based on the ranking of the resources until infeasibility occurs and (e) configuring the environment in accordance with remaining ones of the resources.

In another embodiment, the method includes: (1) ranking the at least one process in non-decreasing order based on numbers of resources that steps in the at least one process can use, (2) accumulating allocations of the resources to the steps as a solution to a minimum cost maximum flow problem based on the ranking of the at least one process, (3) ranking the resources in a non-decreasing order based on numbers of the steps in which the resources can be used, (4) repeatedly removing one of the resources from consideration based on the ranking of the resources until infeasibility occurs and (5) configuring the environment in accordance with remaining ones of the resources.

BRIEF DESCRIPTION

Reference is now made to the following descriptions taken in conjunction with the accompanying drawings, in which.

DETAILED DESCRIPTION

Figure 1:
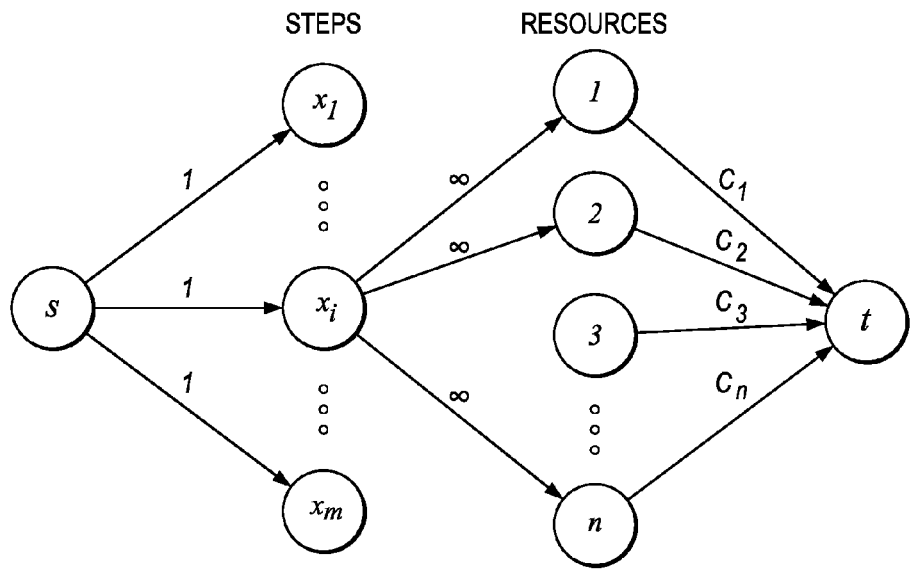
FIG. 1 is a diagram illustrating a maximum flow problem in the context of an example environment.

As stated above, efforts to date have focused on resource allocation with respect to a single (sequential, parallel or distributed) process rather than multiple processes. Described herein are various embodiments of a system and method for performing resource allocation and configuring an environment such that its resources are optimally allocated. Two general categories of embodiments of such system and method will be described: (1) a polynomial-time system and method capable of finding the optimal resource allocation for a single process and (2) a polynomial time system and method capable of yielding nearly optimal resource allocations for multiple processes. The latter can be combined with existing resource management systems to allow a single user to request the exclusive use of a subsystem (e.g., as in Cluster On Demand). Since some embodiments of the system and method reserve minimal resources, remaining resources in the environment are available for concurrent use by other end users. As a result, the overall productivity of all the users sharing the pool of resources is likely to increase.

The batch resource allocation problem undertaken in embodiments of the system and method will now be more precisely formulated as a combinatorial optimization problem. Each process in a batch is viewed as a sequence of steps that requires a certain number of resources. The terms "process," "test" and "computation" are used interchangeably herein. Further, while the term "steps" often connotes a sequential order, it should be understood that "steps" as that term is used herein refers to simultaneous, overlapping; concurrent or parallel steps across which resources cannot be shared. Each of the requirements can be met by any one of several resources enumerated as a set of acceptable possibilities for carrying out the corresponding step.

An instance of the batch resource allocation problem is given by a set B of resources (the universe of available resources) and a batch of processes R=[R_1, ..., R_k] where each process R_i is a sequence [x_i1, x_i2, ..., x_im$_i$] with m$_i$≧1 (the number of resources required by process R_i) and each x_ij ⊂ B (the set of resources that can be placed in step j). A resource allocation A is a function with A(i,j) ∈ B identifying which resource is placed in step j of process R_i. A resource allocation A is valid (or satisfying) if and only if A(i,j) ∈ x_ij and A(i,1)≠A(i,2)≠ ... ≠A(i,m$_i$), for i=1, ..., k and j=1, ..., m$_i$. In other words, a step j can only be filled with a resource from the allowed set x_ij, and no resource can be placed in more than one step for any process R_i. The set of resources allocated by an allocation A, denoted B(A), is given by ∪$_{i=1, ..., k}$ {A(i,j)|j=1, ..., m$_i$}.

The batch allocation problem therefore becomes one of finding a valid resource allocation A such that |B(A)| is minimized. In other words, the problem is that of finding an allocation that uses the fewest total number of resources. Without loss of generality, it is assumed for purposes of the discussion herein that all processes have the same number m of steps, since m can be taken to be the largest m$_i$ among all i, and steps x_ij=B for m$_i$<j≦m can be added to yield the same number m of steps. Any resource can be chosen for the added steps.

One embodiment involves a more general version of this problem where multiple instances of a resource are available, and the same resource is allowed to fill multiple steps in a process up to the number of its instances. In another embodiment, a solution to the batch resource allocation problem as presented herein is combined with existing (single-computation) resource management systems in networking and distributed environments so that a resource set can be reserved in advance for running a batch of computations.

For a single process, a polynomial time system and method for computing a feasible (and minimum) resource allocation will now be described. This system and method is based on constructing a suitable instance of a network maximum flow problem (a problem with known polynomial-time algorithms) whose solution yields the desired resource allocation.

For a batch consisting of multiple processes, the resource allocation problem is NP-hard, which implies that finding an allocation that uses the minimum number of resources is highly likely to require exponential running time. Systems and methods are therefore considered that can yield close to optimum solutions in polynomial time. To this end, a two-phase method will be described that yields a minimal resource allocation while having a small running time.

The two-phase method has a first, "bottom-up," phase and a second, "top-down," phase. The bottom-up phase considers each process in turn, computing a feasible allocation for it, and aggregating its allocations with those computed for the processes already considered. The feasible allocation for each process is computed by finding a minimum cost maximum flow in a specially constructed network where the costs are arranged to ensure that the allocation computed makes maximum use of resources already selected for previously considered processes and any newly selected resources have the greatest potential of being useful to processes that will be later considered. The set of resources constructed from the first phase feeds into the second phase which ranks the resources in the set based on how many steps they can be put into and then tentatively removes resources with lowest ranks first and checks whether it is still feasible to have a resource allocation for each individual process. The feasibility check is performed using the method for resource allocation for a single process. As a result, this second phase finds a minimal set of resources to satisfy all processes in the batch; further removal of any resources from this set would cause a failure in allocating required resources to at least one of the given processes. In some embodiments, the running time of the second phase is proportional to the number of resources in the set from which it starts. The first phase therefore reduces the running time by producing a smaller number of resources that need to be considered in the second phase.

One embodiment of a polynomial-time method for the sub-problem of determining a feasible resource allocation for a single process will now be presented. The feasibility sub-problem (also called feasibility test), given a set B of resources and a single process R_1=[x_l1, x_l2, ..., x_lm] (where x_lj ⊂ B for 1≦j≦m), tries to check whether or not R's requests can be satisfied by B. The feasibility test can be implemented as a network maximum flow problem as shown in FIG. 1. FIG. 1 is a diagram illustrating a maximum flow problem (or a maximum matching of bipartite graphs) in the context of an example environment, where the capacity ck corresponds to the number of copies of the resource k.

Various known algorithms for solving maximum flow problems may be used (e.g., the Ford-Fulkerson Alorithm, the Dinitz Blocking Flow Algorithm, the General Push-Relabel Maximum Flow Algorithm, the Push-Relabel Algorithm with FIFO Vertex Selection Rule, the Dinitz Blocking Flow Algorithm with Dynamic Tree, the Push-Relabel Algorithm with Using Dynamic Trees or the Binary Blocking Flow Algorithm). Irrespective of the algorithm used, it yields a set of resources selected by the maximum flow (or matching). With this implementation of a feasibility test, a naive algorithm can compute all the subsets of resource set B and then check every one of them to see whether they are feasible for all given processes; the smallest all-feasible subset is the final output. Unfortunately, this naive algorithm is impractical, since an exponential number of subsets exists for a given resource set B. Thus heuristics that can yield close to optimum solutions in polynomial time are advantageous.

One embodiment of such a heuristic tries to differentiate different processes and resources by giving them a numeric rank. (The ranking is trivial, of course, if only one process is involved.) In the context of this disclosure, a process's rank reflects its amount of flexibility in its resource requests. For instance, a process allowing a single specific resource in its step is less flexible than another process allowing multiple resources, which is in turn less flexible than yet another process allowing any resource. The flexibility rank(R_1) of a process R_1=[x_l1, x_l2, x_lm] is defined as the number of different ways its request can be satisfied, which includes all the permutations of choosing a resource for each step independently except for those cases violating the exclusiveness requirement of the problem. More precisely:

$$\text{rank}(R\_1) = \Sigma_{1 \leq s \leq m}(-1)^{s+1} \cdot \pi_{1 \leq j1, \ldots, js \leq m} |\cap_{j=j1,\ldots,js} x\_lj|$$

For simplicity, various embodiments employ an approximate rank(R_1) in which only its first few items are used. Similarly, a resource' rank reflects how likely it can be reused in different processes. In other embodiments, the resources are ranked based on how many steps in which they can be used independently. For a resource y, its rank rank_B(y) is:

$$\text{rank\_B}(y) = \Sigma_{1 \leq l \leq k} \Sigma_{1 \leq j \leq m} x\_li(y),$$

where x_li(y)=1 if y ∈ x_li, otherwise x_li(y)=0.

A two-phase system and method will be described herein that yields a minimal allocation while having a relatively short runtime. The two-phase method consists of a first, bottom-up, phase and a second, top-down, phase. The first phase builds up a set of selected resources from bottom up: it first orders the processes in the rank(R_1) non-decreasing order (i.e., considering more constrained processes first) and then uses an improved feasibility test to accumulate allocations for each process in that order into the selected subset. The improved feasibility further associates cost for flows along edges in the network and tries to find a maximum flow with the minimum cost.

Figure 2:
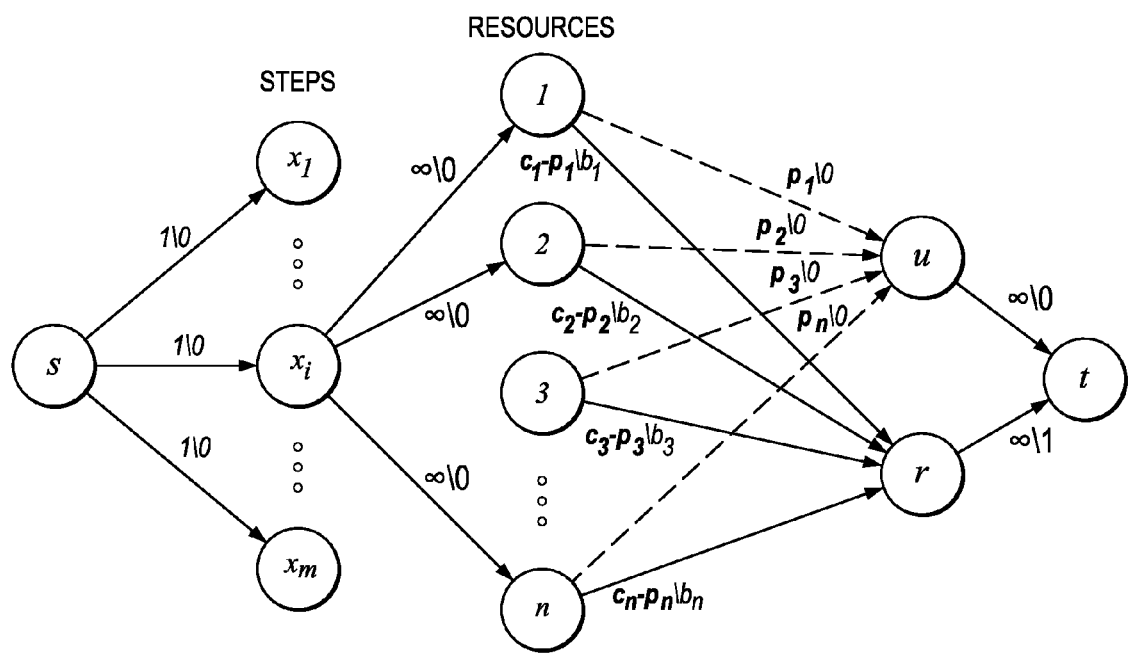
FIG. 2 is a diagram illustrating a solution to the maximum flow problem of FIG. 1 in which the cost of a resource is a function of the resource's rank.

FIG. 2 is a diagram illustrating a network maximum flow solution in which the cost for a resource is a function of the resource's rank. In FIG. 2, the cost bk=1/rank_B(k) for resource k is a reciprocal of the resource's rank, capacity pk corresponds to the number of copies already selected for resource k, and ck is the total number of copies of resource k (in single-copy version, ck=1).

Since this improved feasibility test tries to reuse previously selected resources and prefers resources that have high ranks, this phase greatly reduces the number of resources to be considered (from the whole set B to the selected subset).

The second phase first lists the selected resources resulting from the first phase in the rank_B non-decreasing order, and then tentatively removes resources one by one in the ranked list (that is, to remove resources least likely to be reused first). After the removal of a current resource, if the remaining resource set can not satisfy all processes' requests using the (original) feasibility test, it puts the removed resource back. This removal process continues until after the last resource in the list. The second phase ensures that at the end of the computation further removal of any resource from this remaining set causes a failure in allocating required resources to at least one of the given processes. In other words, the remaining set is a minimal solution (though perhaps not a globally minimized solution).

Figure 3:
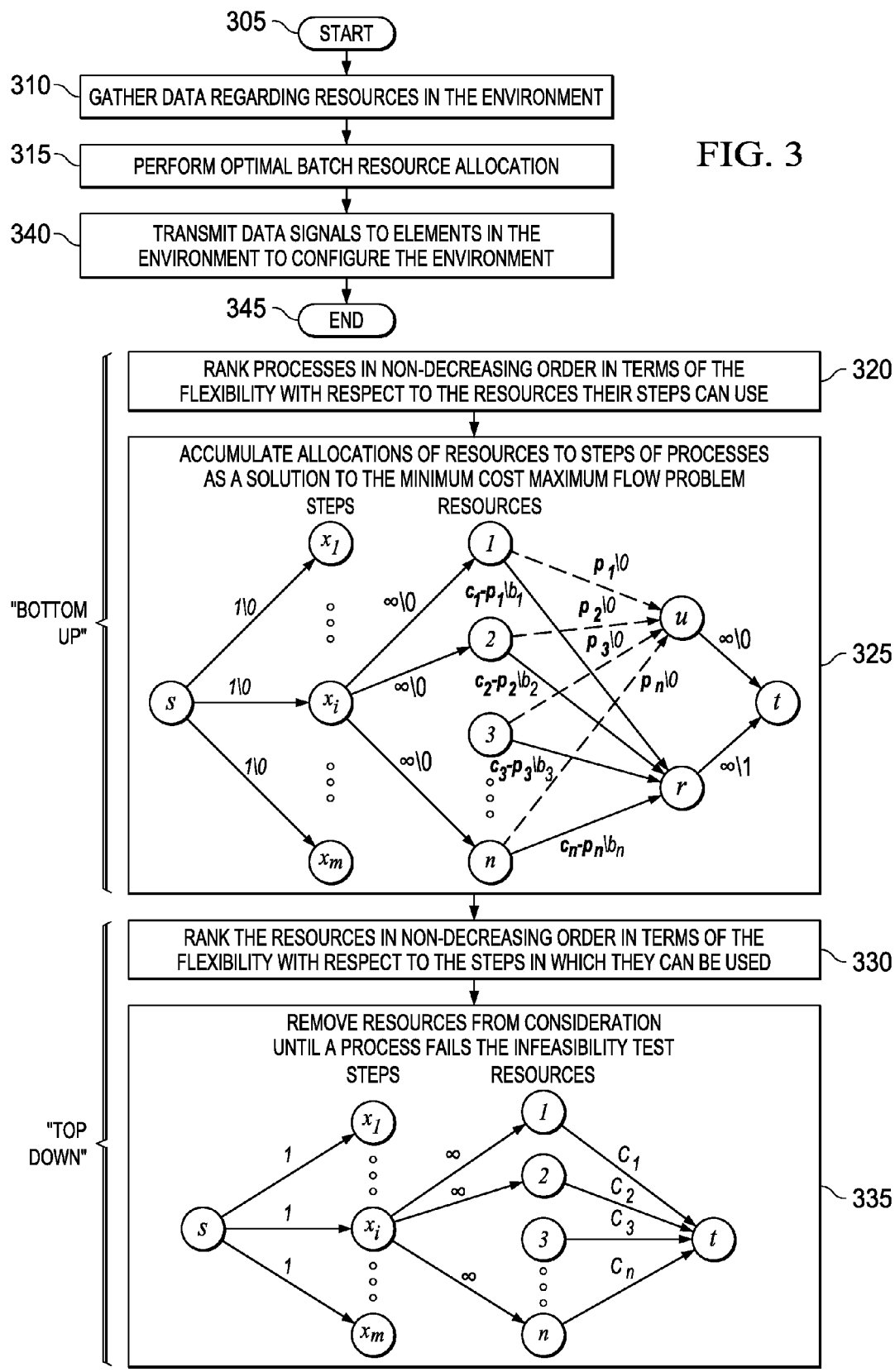
FIG. 3 is a flow diagram of one embodiment of a method of configuring an environment such that its resources are optimally allocated.

FIG. 3 is a flow diagram of one embodiment of a method of configuring an environment such that its resources are optimally allocated. The method begins in a step 305. In a step 310, data regarding resources in the environment are gathered. In a step 315, an optimal batch resource allocation is performed. The optimal batch resource allocation of the illustrated embodiment includes steps 320-335, as follows.

In a step 320, one or more processes are ranked in a non-decreasing order in terms of the flexibility with respect to the resources their steps can use. If only one process is involved, the ranking is trivial. In a step 325, allocations of resources are accumulated to the steps of the one or more processes as a solution to the maximum flow problem. In one embodiment, the resources are accumulated based on the ranking performed in the step 320. In one embodiment, the maximum flow problem is a minimum cost maximum flow problem in which resource costs are taken into account. In a step 330, the resources are ranked in a non-decreasing order in terms of the flexibility with respect to the steps in which they can be used.

In a step 335, resources are removed from consideration until infeasibility occurs (i.e., a process becomes infeasible by virtue of failing an infeasibility test). The remaining resources are then appropriate for allocation to the steps of the one or more processes.

The environment can then be configured in accordance with the remaining resources. Accordingly, in a step 340, the environment is configured. In the illustrated embodiment, data signals are transmitted to elements (i.e., the resources themselves or other hardware, software or combination of hardware and software that control or are otherwise associated with the resources) in the environment to configure those elements accordingly. The method ends in an end step 345.

Figure 4:
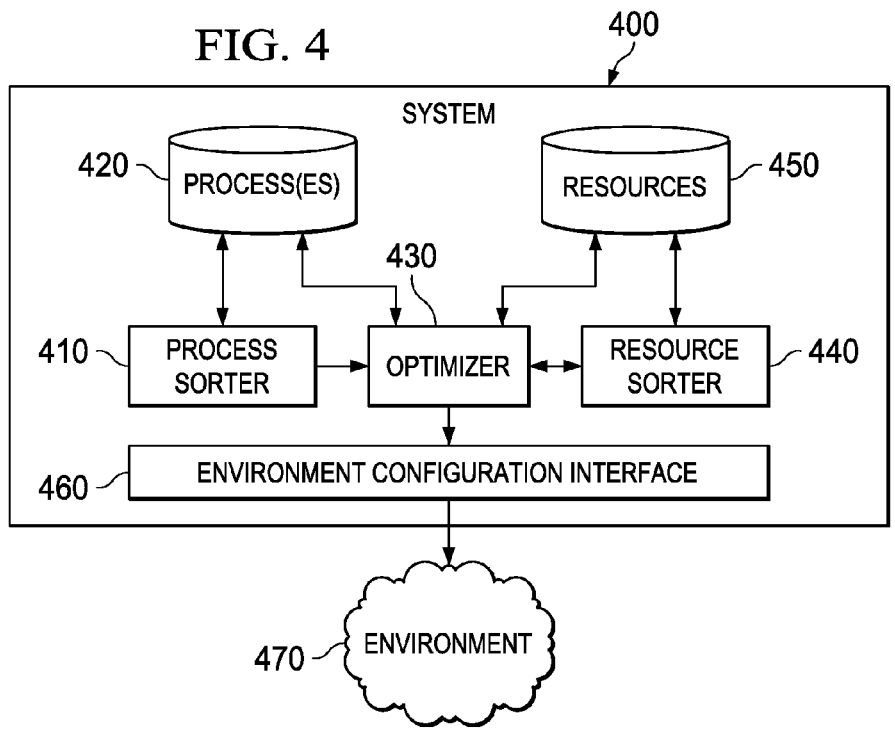
FIG. 4 is a block diagram of one embodiment of a system for configuring an environment such that its resources are optimally allocated.

FIG. 4 is a block diagram of one embodiment of a system 400 for configuring an environment 470 such that its resources are optimally allocated.

The system 400 includes a process sorter 410. The process sorter 410 is configured to rank the at least one process based on numbers of resources that steps in at least one process can use. A database 420 may be employed to contain data describing the at least one process and constituent steps. The system 400 further includes an optimizer 430. The optimizer 430 is coupled to the process sorter 420 and is configured to employ an optimization heuristic to accumulate feasible allocations of resources to the steps based on the ranking of the at least one process. The optimization heuristic may address a maximum flow problem, and perhaps specifically a minimum cost maximum flow problem. A database 450 may be employed to supply data describing the resources to the optimizer 430.

The system 400 further includes a resource sorter 440. The resource sorter 440 is coupled to the optimizer 430 and is configured to rank the resources in a non-decreasing order based on numbers of the steps in which the resources can be used. The optimizer 430 is further configured to remove one of the resources from consideration based on the ranking of the resources until infeasibility occurs. The system 400 further includes an environment configuration interface 460. The environment configuration interface 460 is configured to allow the environment 470 to be configured in accordance with remaining ones of the resources. In the illustrated embodiment, data signals are transmitted to elements in the environment 470 to configure those elements accordingly.

Figure 5:
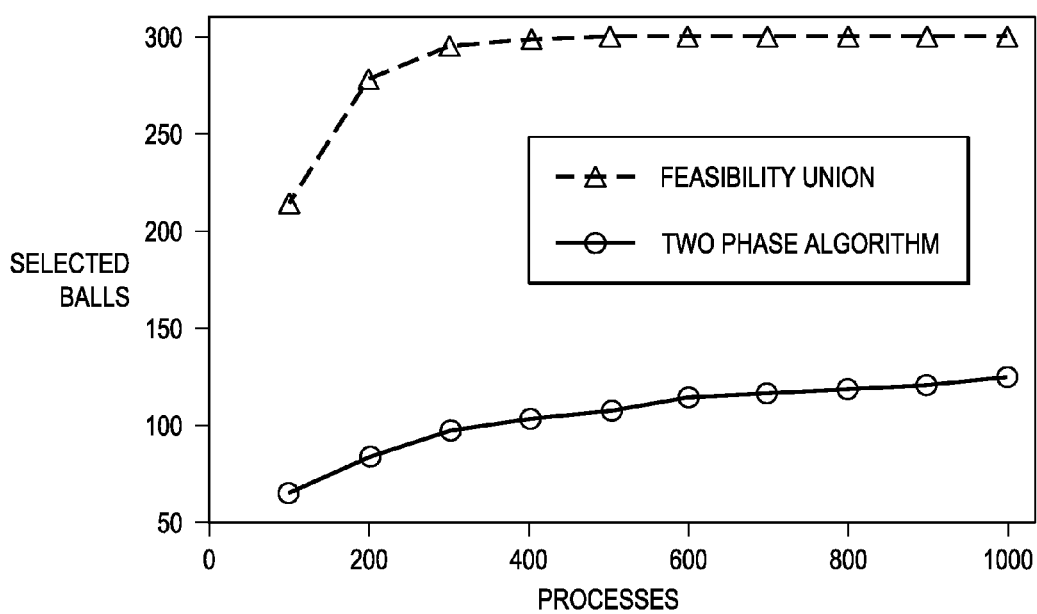
FIG. 5 is a plot comparing execution times of a conventional feasibility union algorithm and one embodiment of a method of optimal batch resource allocation carried out according to the principles of the invention.

FIG. 5 is a graph comparing execution times of a conventional feasibility union algorithm and one embodiment of a method of optimal batch resource allocation carried out according to the principles of the invention. One embodiment of the two-phase method was developed for batch resource allocation and compared with a conventional feasibility union algorithm. It is apparent that the two-phase method yields advantageous results and runtime.

Although motivated by batch software testing, it can be readily seen that various embodiments of the system and method described herein are applicable to optimal resource allocation in the more general setting of networking and distributed computations which contain both mutually exclusive (concurrent) and re-usable (sequential) resource access. General resource management frameworks (commercial or open source) can also employ the system or method disclosed herein to improve resource utilization efficiency.

Those skilled in the art to which this application relates will appreciate that other and further additions, deletions, substitutions and modifications may be made to the described embodiments.

What is claimed is:

1. A system for configuring resources in an environment for use by at least one process, comprising:

a process sorter configured to rank said at least one process based on numbers of resources that steps in said at least one process can use;

an optimizer coupled to said process sorter and configured to employ an optimization heuristic to accumulate feasible allocations of resources to said steps based on said ranking of said at least one process;

a resource sorter coupled to said optimizer and configured to rank said resources in a non-decreasing order based on numbers of said steps in which said resources can be used, said optimizer further configured to remove one of said resources from consideration based on said ranking of said resources until infeasibility occurs; and an environment configuration interface configured to allow said environment to be configured in accordance with remaining ones of said resources.

2. The system as recited in claim 1 wherein said optimizer is further configured to accumulate said feasible allocations of said resources to said steps as a solution to a maximum flow problem.

3. The system as recited in claim 2 wherein said maximum flow problem is a minimum cost maximum flow problem.

4. The system as recited in claim 1 wherein said process sorter is configured to rank said at least one process in non-decreasing order.

5. The system as recited in claim 1 wherein said resource sorter is configured to rank said resources in a non-decreasing order.

6. The system as recited in claim 1 wherein said environment configuration interface is further configured to transmit data signals to elements in said environment.

7. The system as recited in claim 1 wherein said environment is a network and said resources are network resources.

8. The system as recited in claim 1 wherein said environment is a distributed computing environment and said resources are computers.

9. The system as recited in claim 1 wherein said environment is a computer and said at least one process is a software testing process.

10. A method of configuring resources in an environment for use by at least one process, comprising:
(a) ranking said at least one process based on numbers of resources that steps in said at least one process can use;
(b) employing an optimization heuristic to accumulate feasible allocations of resources to said steps based on said ranking of said at least one process;
(c) ranking said resources in a non-decreasing order based on numbers of said steps in which said resources can be used;
(d) removing one of said resources from consideration based on said ranking of said resources until infeasibility occurs; and
(e) configuring said environment in accordance with remaining ones of said resources.

11. The method as recited in claim 10 wherein said employing comprises accumulating said feasible allocations of said resources to said steps as a solution to a maximum flow problem.

12. The method as recited in claim 11 wherein said maximum flow problem is a minimum cost maximum flow problem.

13. The method as recited in claim 10 wherein said ranking said at least one process comprises ranking said at least one process in non-decreasing order.

14. The method as recited in claim 10 wherein said ranking said resources comprises ranking said resources in a non-decreasing order.

15. The method as recited in claim 10 wherein said configuring comprises transmitting data signals to elements in said environment.

16. The method as recited in claim 10 wherein said environment is a network and said resources are network resources.

17. The method as recited in claim 10 wherein said environment is a distributed computing environment and said resources are computers.

18. The method as recited in claim 10 wherein said environment is a computer and said at least one process is a software testing process.

19. A method of configuring resources in an environment for use by at least one process, comprising:
ranking said at least one process in non-decreasing order based on numbers of resources that steps in said at least one process can use;
accumulating allocations of said resources to said steps as a solution to a minimum cost maximum flow problem based on said ranking of said at least one process;
ranking said resources in a non-decreasing order based on numbers of said steps in which said resources can be used;
repeatedly removing one of said resources from consideration based on said ranking of said resources until infeasibility occurs; and
configuring said environment in accordance with remaining ones of said resources.

20. The method as recited in claim 19 wherein costs of said resources are associated with said minimum cost maximum flow problem.

* * * * *